Dec. 10, 1968  R. E. LEE ET AL  3,415,920

MULTILAYER EXTRUSION PROCESS

Filed Aug. 19, 1965

INVENTORS.
Robert E. Lee
Harold J. Donald
BY
Robert B. Ingraham
AGENT

United States Patent Office 3,415,920
Patented Dec. 10, 1968

3,415,920
MULTILAYER EXTRUSION PROCESS
Robert E. Lee and Harold J. Donald, Midland, Mich., assignors to The Dow Chemical Company, Midland, Mich., a corporation of Delaware
Filed Aug. 19, 1965, Ser. No. 481,016
4 Claims. (Cl. 264—171)

ABSTRACT OF THE DISCLOSURE

Corrosive polymers such as vinylidene chloride polymers are extruded in a multilayer structure by encapsulating the corrosive material within a stream of non-corrosive material and subsequently shaping the stream to a film or sheet. Only a relatively small part of the extrusion equipment need be made from corrosion resistant materials.

---

This invention relates to an improved extrusion process and, more particularly, relates to an improved process for the coextrusion of materials which are difficult to extrude.

Oftentimes it is desirable to prepare a multilayer film or sheet composed of a plurality of adhering layers of diverse, synthetic, resinous materials. Such multilayer sheets or films are prepared by a variety of means. Oftentimes it is desirable to employ as one or more of the inner layers a resinous composition containing a relatively high proportion of halogen, such as the vinylidene-vinyl chloride copolymers, vinylidene-acrylonitrile copolymers and the like polymeric materials containing high proportions of vinylidene chloride copolymerized therein. Such polymers are generically known as sarans. Other difficultly extrudable polymers having high moisture vapor barrier characteristics as well as gas barrier properties frequently are desirable. Usually, such barrier materials are difficult to extrude into a desired form and it is necessary oftentimes to add plasticizers and lubricants which detract from the desired barrier characteristics in order to obtain the flow characteristics necessary to permit extrusion into a desired configuration.

Beneficially, in many cases it is desired to provide a composite film or sheet structure wherein in a barrier layer of a halogenated resin is centrally disposed between layers of a polyolefin resin. Generally the adhesion characteristics of the polyolefin resin to the barrier layer oftentimes are less than desired. Further in the extrusion of halogenated materials, such as sarans, special corrosion-resistant alloys must be used for the extruder and dies in order to prevent undesired decomposition of the resin and corrosion to the equipment.

It would be desirable if there were available a method for the extrusion of multilayer film or sheet which would permit the use of a maximum amount of conventional extrusion equipment suitable for polyolefins and a minimum amount of extrusion equipment designed for the corrosive halogenated materials.

It would also be desirable if such a method were available which would permit the ready inclusion of desired quantities of adhesion-promoting agent adapted to bond the polyolefin to a centrally disposed barrier layer of a halogenated polymer. It would also be advantageous if such a method were adapted to produce a product having desired dimensional relationship between the various layers thereof.

These benefits and other advantages in accordance with the method of the present invention are achieved in a method for the extrusion of a composite layered film comprising providing a first stream of a heat-plastified, thermoplastic, resinous material extruding within the heat-plastified stream a second stream comprising a diverse resinous material to form a composite layered heat-plastified stream, forming the composite stream into a desired sheet-like configuration and reducing the temperature of the stream below the heat-plastified temperature thereof, the improvement which comprises introducing into the first stream a third stream which comprises an inner layer and an outer layer of a material which adheres the inner layer to the material of the first stream.

The method of the invention is beneficially practiced employing apparatus which comprises in cooperative combination means to supply a first stream of a heat-plastified, thermoplastic material, means to supply a second stream of a heat-plastified, thermoplastic, resinous material, means to supply a third stream of a heat-plastified, thermoplastic resinous material, a die defining an internal cavity and an extrusion orifice, the extrusion orifice having a generally elongated configuration and adapted to extrude a sheet therefrom, a first conduit, a second conduit, and a third conduit, the first conduit providing communication between the first stream supply means and the cavity of the die, the second conduit providing communication between the second supply means and the internal cavity of the die, the second conduit extending generally parallel to the extrusion orifice of the die and defining an internal extrusion orifice generally parallel to the extrusion orifice of the die, the third conduit being in communication with the third supply means and the second conduit, the third conduit terminating within the second conduit at a location remote from the internal orifice defined by the second conduit, the termination of the third conduit being disposed within the second conduit generally remote from the internal wall of the second conduit.

Further features and advantages of the present invention will become more apparent from the following specification taken in connection with the drawing wherein.

Figure 1:
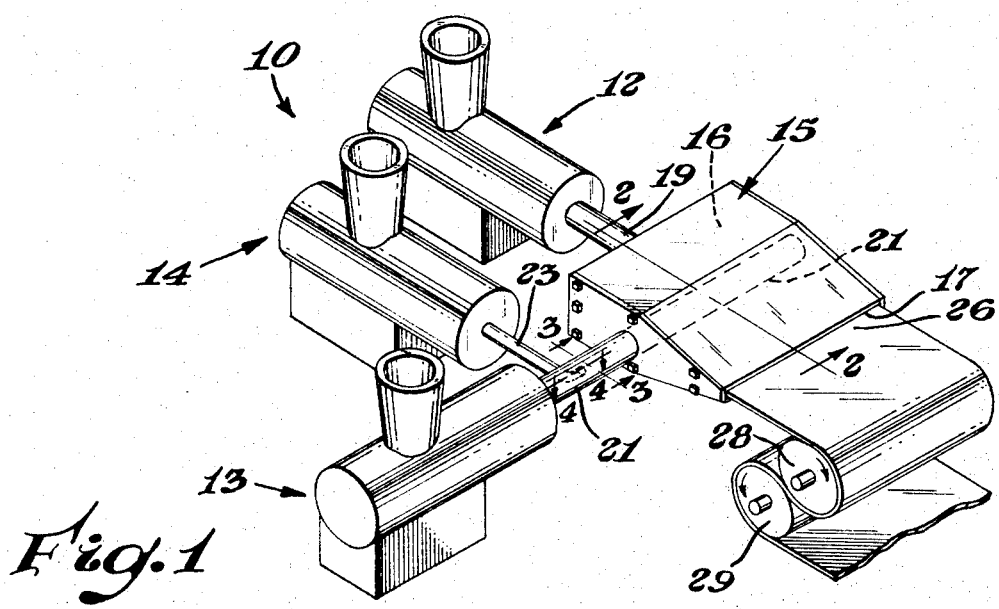
FIGURE 1 is a schematic, isometric representation of an apparatus for the practice of the invention.

In FIGURE 1 there is schematically illustrated an apparatus generally designated by the reference numeral 10 for the practice of the present invention. The apparatus 10 comprises a first extruder or heat-plastified stream supply means 12, a second extruder or heat-plastified stream supply means 13, a third extruder or heat-plastified stream supply means 14, a die 15 defining an internal cavity 16 and an extrusion orifice 17. The extrusion orifice 17 has an elongated configuration and is particularly adapted to extrude a sheet therefrom. A first conduit 19 provides communication between the extruder 12 and the internal cavity 16 of the die 15. A second conduit 21 provides communication between the cavity 16 and the extruder 13. The conduit 12 extends generally the entire width of the cavity 16. A third conduit 23 is in operative cooperation with the extruder 14 and the second conduit 21. A composite, thermoplastic sheet or film 26 is shown issuing from the extrusion orifice 17. A pair of processing rolls 28 and 29 serves to cool the sheet 26 below its thermoplastic temperature.

Figure 2:
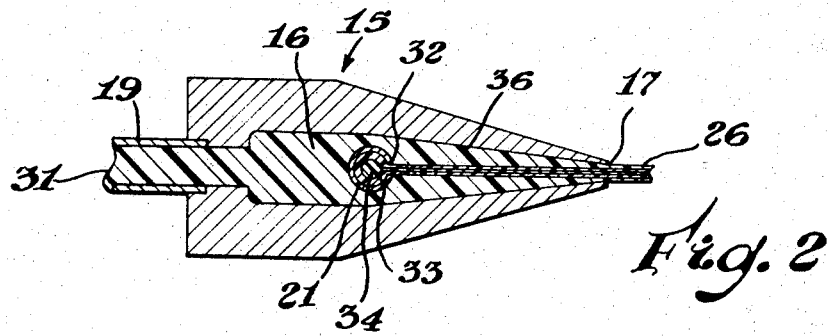
FIGURE 2 is a cross section of a die employed in FIGURE 1 taken along the line 2—2 thereof.

In FIGURE 2 there is illustrated a cross section of the die 15 taken along the line 2—2 of FIGURE 1. The section depicts the relationship between the cavity 16 of the die 15, the conduit 19 remote from the extruder 12 which supplies a first heat-plastified stream 31 to the cavity 16 of the die 15 at a position remote from the extrusion orifice 17. Within the cavity 16 of the die 15 extends conduit 21 which defines an internal or second extrusion orifice 32 which is generally disposed remote from the terminal portion of the conduit 19 and adjacent to the extrusion orifice 17. The extrusion orifice 32 has a generally slot-like configuration and extends for generally about the entire width of the cavity 16 of the die 15. Within the conduit 21 is a second stream of heat-plastified, thermoplastic, resinous second stream 33 of a heat-plastified, resinous material and a third stream 34 of a third heat-plastified, synthetic, resinous material which is substantially enveloped within the second stream 33. The first stream 31, second stream 33, and third stream 34 unite to form a composite stream 36 which is subsequently extruded from the orifice 17 to form the composite film 26.

Figure 3:
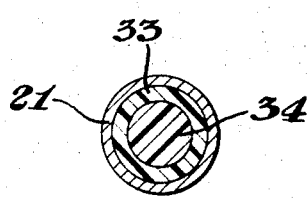
FIGURE 3 is a cross section of the apparatus of FIGURE 1 taken along the line 3—3.

In FIGURE 3 there is illustrated a cross-sectional view of the conduit 21 taken along the line 3—3 of FIGURE 1. FIGURE 3 shows the second stream 33 and the third stream 34 in substantially coaxial relationship with each other wherein the second stream 33 encloses or envelopes the third stream 34.

Figure 4:
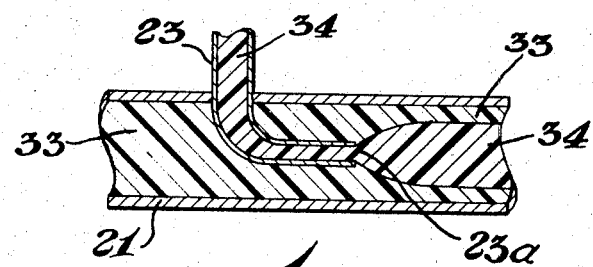
FIGURE 4 is a cross section of a portion of the apparatus of FIGURE 1 taken along the line 4—4.

In FIGURE 4 there is shown a sectional view of the conduits 21 and 23 of FIGURE 1 taken along the line 4—4 thereof. A second stream of heat-plastified, thermoplastic, resinous material 33 is disposed within the conduit 21. A third stream of heat-plastified, thermoplastic, resinous material 34 is disposed within the conduit 23. The terminal portion of the conduit 23 designated as 23a is disposed within the conduit 21 and is in spaced relationship to the walls thereof. The third stream 34 is discharged into the conduit 21 in such a manner that it is entirely enveloped by the second stream 33. In operation of the apparatus in accordance with FIGURE 1, a first thermoplastic, resinous stream is supplied by the extruder 12 which passes through conduit 19 into the cavity 16 of the die 15. Desirably in start-up of such an apparatus, the extruder 12 provides the first stream 31 to the cavity 16 and extrudes a one-component, non-layered film until desired extrusion conditions are achieved, whereupon the extruder 13 is started providing the second stream 33 which, in the absence of the stream 34, will fill the conduit 21 and extrude from orifice 32 in essentially a sheet-like configuration, and the resultant product is then a three-layered film or sheet consisting of composition 31, 34, 31. When its desired temperature is achieved, the extruder 14 is started, extruding a barrier material in heat-plastified condition as stream 34. The stream of heat-plastified material in the conduit 21 within the die 15 provides a two-component stream which is then extruded through the slot 32 in the manner illustrated in FIGURE 2, resulting in a five-layer film such as the film 26 of FIGURE 2. The resultant film is then cooled by suitable means such as the rolls 28 and 29 as illustrated in FIGURE 1. Beneficially, in the manipulation of thermoplastic, resinous materials of a corrosive nature, only the extruder 14 and the conduit 23 must be of corrosion-resistant material. If a corrosive material is employed for the stream 34, it is successfully isolated from the conduit 21 by the stream 33 and from the die 15 by the streams 31 and 33. By varying the relative output of the first, second, and third extruders, almost any desired relationship can be achieved in the dimensions of the layers of the resultant film. Generally, the extruders 12, 13 and the die 15 can be constructed from materials such as carbon steel which is suitable for use with polyolefins such as polyethylene, polypropylene, polystyrene and like relatively innocuous, extrudable, thermoplastic, resinous materials whereas the barrel and screw of the extruder 14 as well as the conduit 23 desirably are constructed from materials such as stainless steel, nickel and like corrosion-resistant metals or metal alloys which are suitable for the particular material employed in the central layer or for the preparation of the stream 34.

In operation of the apparatus for the practice of the method of the invention, the critical extrusion temperature is that temperature which is most suitable for the outer layer of the composite stream 36 or the material of the stream 31. When suitable extrusion conditions are achieved for this material, the temperature employed for streams 33 and 34 may deviate widely from the single layer extrusion conditions generally recommended for such materials.

The usable temperature range for extrusion is oftentimes doubled and sometimes even tripled. However, generally the barrier or center layers such as the layer 34 is oftentimes of a halogenated material such as a saran, and for minimum decomposition and maximum desirable characteristics of the resultant product, it is usually beneficial to extrude such a material at the lowest possible temperature to minimize thermal degradation. The requirement for the central layer is that the material be extrudable within a sheath of another polymer and that the composition have the desired characteristics. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride copolymers are prepared utilizing such comonomers as methyl, ethyl, isobutyl, butyl, octyl and 2-ethylhexyl acrylates and methacrylates; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl α-chloroacrylate, octyl α-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenylvinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C$ group. The most useful ones fall within the general formula

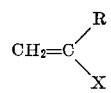

where R may be hydrogen, a halogen or a saturated aliphatic radical and X is selected from one of the following groups:

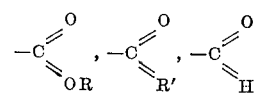

in which R' is alkyl.

Beneficially in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion substantially reduced and the probability of decomposition of the polymer in the extruder is lowered. Typical plasticizers which are employed in the vinylidene or saran combinations are acetyl tributyl citrate, epoxidized soyabean oil (commercially available under the trade designation of Paraplex G-60) and dibutyl sebacate. Commercially available light stabilizers may also be incorporated in the vinylidene chloride material such as tertiary-butyl salol. Other barrier compositions which may and from about 10 to about 40 weight percent vinyl acetate and 90 to 60 weight percent ethylene. Also useful is chlorinated polyethylene containing from about 20 to about 40 weight percent chlorine.

By way of further illustration employing an apparatus generally as illustrated in FIGURE 1, multilayer films are prepared under conditions and at rates as set forth in the following table:

TABLE 1.—EXTRUSION DATA ON 3 AND 5 LAYER FILMS

| Sample No. | Layer composition | Thickness, mils | Plastic, temp. (° C.) | Die, temp. (° C.) | Rate, lbs./hr. | Chill roll, temp. (° C.) |
|---|---|---|---|---|---|---|
| (8) | PE (B) | 1.70 | 190 | 215 | 174 | 80 |
|  | PEVAc (C) | 0.10 | 190 |  |  |  |
|  | Saran (A) | 0.42 | 140 |  |  |  |
|  | PEVAc (C) | 0.10 |  |  |  |  |
|  | PE (B) | 1.70 |  |  |  |  |
| (9) | PE (B) | 1.00 | 190 | 230 | 170 | 85 |
|  | PEVAc (C) | 0.10 | 200 |  |  |  |
|  | Saran (A) | 0.75 | 153 |  |  |  |
|  | PEVAc (C) | 0.10 |  |  |  |  |
|  | PE (B) | 1.00 |  |  |  |  |
| (10) | PE (B) | 1.65 | 190 | 225 | 160 | 85 |
|  | PEVAc (C) | 0.10 | 195 |  |  |  |
|  | Saran (A) | 0.50 | 144 |  |  |  |
|  | PEVAc (C) | 0.10 |  |  |  |  |
|  | PE (B) | 1.65 |  |  |  |  |
| (11) | PE (B) | 1.75 | 185 | 225 | 174 | 90 |
|  | PEVAc (C) | 0.15 | 200 |  |  |  |
|  | Saran (A) | 0.25 | 140 |  |  |  |
|  | PEVAc (C) | 0.15 |  |  |  |  |
|  | PE (B) | 1.75 |  |  |  |  |
| (12) | PE (B) | 0.65 | 190 | 225 | 160 | 87 |
|  | PEVAc (C) | 0.10 | 200 |  |  |  |
|  | Saran (A) | 0.50 | 145 |  |  |  |
|  | PEVAc (C) | 0.10 |  |  |  |  |
|  | PE (B) | 0.65 |  |  |  |  |
| (13) | PE (B) | 0.72 | 185 | 225 | 160 | 90 |
|  | PEVAc (C) | 0.10 | 200 |  |  |  |
|  | Saran (A) | 0.25 | 140 |  |  |  |
|  | PEVAc (C) | 0.10 |  |  |  |  |
|  | PE (B) | 0.72 |  |  |  |  |
| (19) | PE (B) | 1.09 |  | 325 |  |  |
|  | DS 204 (C) | 0.10 |  |  |  |  |
|  | Saran (A) | 0.61 |  |  |  |  |
|  | DS 204 (C) | 0.10 |  |  |  |  |
|  | PE (B) | 1.10 |  |  |  |  |
| (20) | PE (B) | 0.60 |  |  |  |  |
|  | DS 204 (C) | 0.10 |  |  |  |  |
|  | Saran (A) | 0.40 |  |  |  |  |
|  | DS 204 (C) | 0.10 |  |  |  |  |
|  | PE (B) | 0.60 |  |  |  |  |
| (21) | PE (B) | 1.14 | 162 | 200 |  | 180 |
|  | DS 204 (C) | 0.10 |  |  |  |  |
|  | Saran (D) | 0.52 |  |  |  |  |
|  | DS 204 (C) | 0.10 |  |  |  |  |
|  | PE (B) | 1.15 |  |  |  |  |
| (22) | PE (B) | 1.17 |  |  |  |  |
|  | DS 204 (C) | 0.10 |  |  |  |  |
|  | Saran (E) | 0.46 |  |  |  |  |
|  | DS 204 (C) | 0.10 |  |  |  |  |
|  | PE (B) | 1.17 |  |  |  |  |

(A) 93.75 parts by weight of a copolymer of 85 weight percent vinylidene chloride and 15 weight percent vinyl chloride, 4.50 parts by weight acetyltributyl citrate, 1.00 part by weight of an epoxidized soyabean oil commercially available under the trade designation of Paraplex G-60, 0.75 part by weight of 4-tertiarybutyl salol.
(B) Polyethylene, density 0.930, melt index 3.8.
(C) Copolymer of 72 weight percent ethylene and 28 weight percent vinyl acetate, melt index 3.0.
(D) (A) plus 2.25 parts by weight of acetyltributyl citrate.
(E) A copolymer of 85 weight percent vinylidene chloride and 15 weight percent vinyl chloride plasticized with 3 parts by weight per hundred parts by weight of copolymer of an epoxidized soyabean oil commercially available under a trade designation of Paraplex G-60.

be used with benefit in films prepared by the method of the present invention are vinyl chloride polymers which contain a predominant amount of vinyl chloride therein, and beneficially fluorocarbon polymers, fluorohydrocarbon polymers, fluorohalohydrocarbon polymers, such as polyvinyl chloride, polyvinylidene fluoride, chlorinated polyethylene and polymers of such materials as vinylidene fluoride, vinylidene fluoride and chlorotrifluoroethylene, vnylfluoride, chlorotrifluoroethylene and vinylidene fluoride, chlorotrifluoroethylene and vinyl chloride, chlorotrifluoroethylene and vinylidene fluoride and tetrafluoroethylene and the like. Generally, for economic reasons, the vinylidene chloride polymers are employed as they are most readily available at relatively low cost.

Outer layers which are particularly desirable and beneficial are those prepared by polyethylene, polypropylene or the resinous copolymers of ethylene and propylene. Beneficial materials which are suitable for the intermediate layer or second stream are chlorinated polyethylene copolymers of from about 14 to 15 weight percent ethyl acrylate and from about 86 to 50 weight percent ethylene No evidence of internal decomposition of the centrally disposed layer was observed in the preparation of the foregoing samples. No evidence of equipment corrosion was observed in so far as could be determined in à central and barrier layer was separate at all times by an outer layer of resin from the surface of the equipment in the downstream direction from the opening 23A of FIGURE 4.

In a manner similar to the foregoing illustration, other beneficial and advantageous composite films are readily prepared employing the method of the present invention.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or limiting of the present invention, excepting as it is set forth and defined in the hereto appended claims.

What is claimed is:

1. A method for the extrusion of a composite layered film of synthetic resinous thermoplastic material wherein one of the components of the film when in heat plastified form is a halogen-containing polymer and subject to thermal degradation under extrusion conditions and generally requires corrosion resistant apparatus for its heat fabrication, the steps of the method comprising provinding a first stream of heat plastified thermoplastic resinous material which is of a relatively heat stable and non-corrosive nature, providing a second stream of generally corrosive thermoplastic resinous material in heat plastified form, encapsulating the second stream within a third stream of extrudable relatively heat stable thermoplastic material, which, below the heat plastified temperature, adheres to the material of the second stream and the first stream, shaping the first stream into a generally sheet-like configuration, shaping the second and third streams into a generally sheet-like configuration, disposing the second and third streams within the first stream wherein the third stream is disposed between the first and second streams to thereby form a three component composite stream, forming the composite stream to a desired sheet-like configuration, and subsequently reducing the temperature of the composite stream below the heat plastifying temperatures of its components.

2. The method of claim 1 wherein the first stream is a polyolefin.

3. The method of claim 1 wherein the second stream is a vinylidene chloride polymer.

4. The method of claim 1 wherein the outer layer is a polymer of ethylene and vinyl acetate.

References Cited

UNITED STATES PATENTS

| | | | |
|---|---|---|---|
| 3,223,761 | 12/1965 | Raley | 264—95 |
| 3,241,503 | 3/1966 | Schafer | 18—13 |

ROBERT F. WHITE, *Primary Examiner.*

G. AUVILLE, *Assistant Examiner.*

U.S. Cl. X.R.

18—13